United States Patent [19]
Steingold

[11] 3,868,706
[45] Feb. 25, 1975

[54] TELEVISION CAMERA MOUNT

[76] Inventor: Harold Steingold, 407 16 St., Santa Monica, Calif. 90402

[22] Filed: Oct. 12, 1973

[21] Appl. No.: 406,025

[52] U.S. Cl. ................................................. 354/95
[51] Int. Cl. ........................................... G03b 37/02
[58] Field of Search ..................... 95/15; 354/94, 95

[56] References Cited
UNITED STATES PATENTS
3,349,680  10/1967  Hellenkamp ...................... 95/15 X

*Primary Examiner*—John M. Horan

[57] ABSTRACT

A camera mount is disclosed herein for movably supporting a television camera so that its optical axis may be simultaneously rotated about a vertical and a horizontal axis. The mount includes an integral pan tilt assembly having a mirror carried on a rotating sub-housing operably coupled to a tilt mechanism so that the mirror lies along the optical axis of the camera. Tilting of the mirror and rotation thereof is provided by a controlled motor, whereby the weight of the camera is evenly balanced thereon regardless of camera optical axis, rotational or tilt position.

4 Claims, 3 Drawing Figures

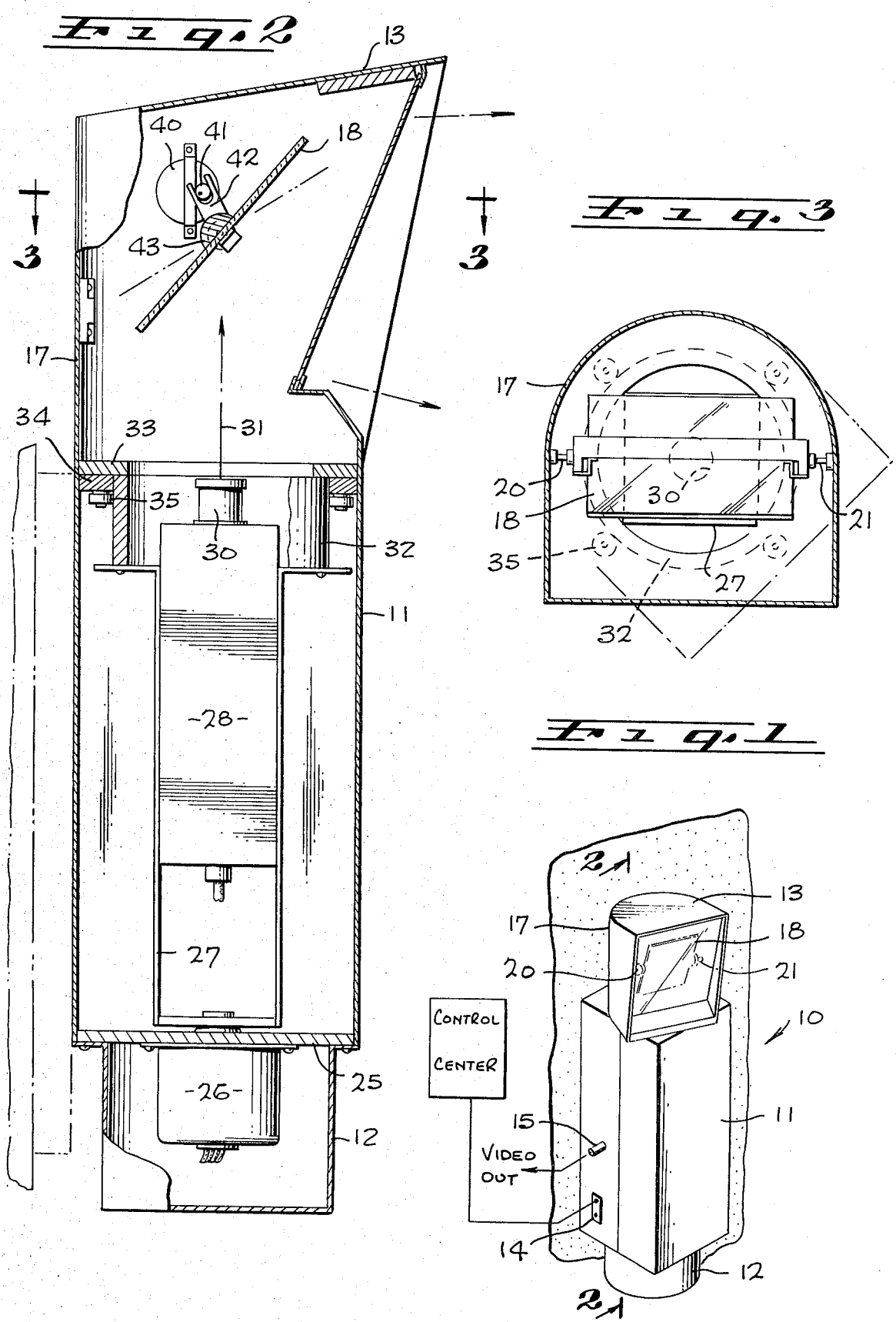

TELEVISION CAMERA MOUNT

BACKGROUND OF THE INVENTION

1. Field of the Invention

This invention relates to mounting apparatus for cameras and more particularly to a novel television camera mount capable of balancing the camera weight regardless of angular movement of the camera during a filming sequence or procedure.

2. Description of the Prior Art

In the past, universal mounts have been employed for movably securing a movie camera to a fixed base such as a tripod. Usually, as the cameraman operates the camera during a filming sequence, the camera is manipulated on the universal mount so that its optical axis follows various horizontal and vertical planes and vectored combinations thereof. Prior art universal mounts permit a variety of movements; however, such a mount does not compensate nor provide a means for accommodating balancing of the camera weight. The center of gravity is likely to be somewhere other than at the center of system rotation. This deficiency in prior art camera mounts results in an unstabilized condition when the cameraman rotates the optical axis along a vertical plane. In other words, since the tilt axis is under the camera employing conventional tripod heads, the weight of the camera is disposed substantially ahead, behind or to either side of the tripod head. This disposition results in an unbalanced condition with varying tension throughout any vertical movement since the balance of the camera is not stabilized. This condition is disadvantageous since the camera operator must compensate continuously as a film sequence is being made.

Therefore, a long standing need has been present for providing a balanced mounting for securing a camera onto a supporting platform.

SUMMARY OF THE INVENTION

Accordingly, the problems and difficulties encountered by conventional camera mounts are obviated by the present invention which provides a novel camera mount providing the same amount of tension throughout any vertical movement whereby the balance of the camera is maintained constant.

In one embodiment of the invention, a stationery housing is provided for rotatably carrying a television camera and its motor drive means. A sub-assembly is directly mounted on the camera so as to rotate therewith and which constitutes a pan/tilt assembly including a mirror operably coupled to a tilt mechanism. The mirror lies along the optical axis of the camera. The motor drive means controls vertical tilting of the mirror and rotation thereof is via rotation of the camera along a horizontal plane. Thereby, the weight of the camera is evenly distributed on the housing and the supporting housing encounters an even or constant tension as the camera is moved during the filming sequence.

Therefore, it is among the primary objects of the present invention to provide a novel camera mounting apparatus having the camera optical tilt axis lying along the camera center of gravity.

Another object of the present invention is to provide a novel mirror device in a rotating and tilting sub-assembly that will deflect image and light rays received horizontally at right angles downward along the optical axis of a camera.

Another object of the present invention is to provide a novel camera mount having the same turning tension throughout any vertical or horizontal movement of the optical axis during a pan/tilt sequence due to proper balance of the camera which is made constant.

A further object resides in providing a television camera in which positive mechanical synchronization is maintained during a pan/tilt filming sequence between the vertical and horizontal reflected images.

Still a further object of the present invention is to provide a novel cradle or mount for a camera providing ease of movement in a universal mode of operation.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of the novel integral pan/tilt camera apparatus of the present invention;

FIG. 2 is an enlarged cross-sectional view of the apparatus shown in FIG. 1 as taken in the direction of arrows 2—2 thereof; and FIG. 3 is a transverse section view of the pan/tilt sub-assembly taken in the direction of arrows 3—3 of FIG. 2.

DESCRIPTION OF THE PREFERRED EMBODIMENT

The novel integral pan/tilt camera system of the present invention is indicated in the general direction of arrow 10 in FIG. 1 which comprises a stationary housing 11 having a motor enclosure 12 downwardly depending from the underside thereof and a rotating turret 13 carried on the upper end of the stationary housing. The housing includes a cable junction box 14 and a video signal output connector 15. The connection box is useful for securing cabling and other remote controls that may be located in a control central 16. Preferably, the stationary housing 11 includes a cover or door that may be readily opened to gain access to the interior which houses a conventional television camera.

The turret 13 is rotatably carried on stationary housing 11 and includes a rounded back panel indicated by numeral 17 so that the apparatus may be mounted flush against a wall by corner screws and still permit the turret 13 to swivel plus or minus 90° relative to the normal line of sight to the wall. The turret further includes a mirror 18 which is adapted to rotate about horizontal axis at pivot junction 20 and 21 located on opposite and opposing side walls of the turret separated by the mirror 13. Therefore, it can be seen that images picked up by the mirror are derived from rotation of the mirror about a vertical axis as the turret rotates and about a horizontal axis as the mirror is tilted.

Referring now in detail to FIG. 2, it can be seen that the stationary housing 11 includes a base or platform 25 which serves to support a conventional electric motor 26. The drive shaft of the motor extends through platform 25 and is coupled to the lower end of a support bracket 27 which supports and mounts a conventional TV camera 28. The camera includes an optical lens system which, for simiplicity, may be said to be housed within cylindrical lens 30. The optical axis of camera 28 is indicated by the line and arrow 31 and the optical axis is centered on the face of mirror 18. The support and mount 27 is coupled to a cylindrical shaft or bearing 32 that includes a flange 33 rotatably supported on an upper plate 34 of the stationary housing. The turret 13 is mounted on the flange 33 so that as motor 26 drives camera 28 about a vertical axis, this motion is translated into a horizontal rotary or pan movement of mirror 18 with respect to the stationary housing. In order to facilitate rotation of the turret, a plurality of rollers, such as roller 35 engage with the exterior surface of the bearing 32.

A tilt motor 40 is provided for rotating an eccentric cam 41 which is positioned in a slot provided in member 42. Member 42, in turn, is secured to a support piece 43 carried on the back of mirror 18. Therefore, as the motor 40 receives operating signals from the control center, eccentric shaft 41 will rotate and thereby ride within the slot in member 42 to tilt the mirror 18 in a vertical manner.

As shown more clearly in FIG. 3, the rotational movement in a horizontal plane of turret 13 is illustrated in broken lines so that images are received by the mirror from the direction indicated by the arrows. The optical axis of camera 30 is centered on the mirrored surface of mirror 18.

Therefore, it can be seen that the integral pan/tilt camera system of the present invention provides a simplified unit that may be readily bolted onto the surface of a wall for mounting. No cavity or other wall installation is required. The apparatus is fundamentaly in static balance as the mirror is rotated either by the turret 13 or by the tilt drive motor. In situations where very rapid pan/tilt motions are required, the integral unit of the present invention will out perform the conventional separate component part cameras. The moments of inertia which are derived in the present invention are smaller in the horizontal or pan direction and the mirror when tilted has much less moment of inertia than in conventional tilt mechanism. Furthermore, the unit of the present invention is weatherproof and there is only one mechanical joint in the system through which moisture could penetrate. Inasmuch as the present system is in static balance with regard to the horizontal or pan motion axis, the effect of external wind forces is greatly minimized.

The mirror 18 may be rotated by activating motor 26 to rotate support or bracket 27 carrying camera 28. This rotation is translated into rotation of the turret 13 and the mirror by means of the bearing or collar 32. Tilting of the mirror 18 is achieved by actuation of motor 40 which eccentrically drives or pivots mirror 18.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An integral pan/tilt camera apparatus comprising the combination of:
   a stationary housing;
   a turret movably mounted on said housing for horizontal rotation;
   a mirror pivotally carried on said turret for vertical rotation;
   a camera having a center of gravity carried on said housing and mounted for rotation in conjunction with said turret, said camera center of gravity being critically located at the center of rotation so that said camera is in static-balance during said rotational movements;
   motor means for driving said camera and said turret in horizontal rotation about a vertical axis and for driving said mirror in vertical rotation about a horizontal axis;
   an opaque support bracket rotatably mounting said camera in said housing so that its optical axis is directed towards said mirror;
   a bearing means rotatably supporting said bracket and said camera on said housing;
   said bearing means includes a central aperture through which said camera optical axis passes to said mirror;
   a drive motor secured to said housing having a drive shaft operably coupled to said camera support bracket;
   a tilt drive motor carried on said turret operably coupled to said mirror; and
   an eccentric drive train interconnecting said tilt drive motor with said mirror.

2. The invention as defined in claim 1 wherein said camera center of gravity is located at the center of system rotation so that said camera is in static balance during said rotational movements.

3. The invention as defined in claim 1 wherein said camera apparatus includes a single moving joint constituting said bearing means as the only moving joint in the entire apparatus.

4. The invention as defined in claim 3 wherein said turret includes an opening ahead of said mirror constituting a window for admitting images and light rays to said mirror for reflection along said optical axis.

* * * * *